United States Patent
Park et al.

(10) Patent No.: US 10,921,552 B1
(45) Date of Patent: Feb. 16, 2021

(54) AUTOFOCUS APPARATUS AND CAMERA MODULE INCLUDING THE SAME

(71) Applicant: JAHWA electronics Co., Ltd., chungcheongbuk-do (KR)

(72) Inventors: Chul Soon Park, Chungcheongnam-do (KR); Byung cheol Lee, Gyeongsangnam-do (KR); Kyoung Yong Lee, Chungcheongbuk-do (KR); Je Seung Yeon, Chungcheongbuk-do (KR); In su Kang, Chungcheongbuk-do (KR)

(73) Assignee: JAHWA ELECTRONICS CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 16/837,183

(22) Filed: Apr. 1, 2020

(30) Foreign Application Priority Data

Nov. 11, 2019 (KR) .................. 10-2019-0143146

(51) Int. Cl.
*G02B 5/08* (2006.01)
*G02B 7/182* (2021.01)
*G03B 13/36* (2021.01)
*G03B 17/17* (2021.01)

(52) U.S. Cl.
CPC ............ *G02B 7/182* (2013.01); *G03B 13/36* (2013.01); *G03B 17/17* (2013.01)

(58) Field of Classification Search
CPC ...................................................... G02B 7/182
USPC ............................................................ 359/862
See application file for complete search history.

(56) References Cited

U.S. PATENT DOCUMENTS

2018/0239161 A1* 8/2018 Seol .................... G02B 7/1821

FOREIGN PATENT DOCUMENTS

| CN | 106444223 A | 2/2017 |
| KR | 10-2018-0085460 A | 7/2018 |
| KR | 10-2018-0091452 A | 8/2018 |
| KR | 10-2019-0071569 A | 6/2019 |

* cited by examiner

*Primary Examiner* — James C. Jones
(74) *Attorney, Agent, or Firm* — The PL Law Group, PLLC

(57) ABSTRACT

An autofocus apparatus according to an embodiment of the present invention includes a reflector provided to a rear side of a lens assembly and configured to change a path of a light passing through the lens assembly so that the light is oriented toward an image sensor; a carrier to which the reflector is mounted, the carrier being configured to linearly move in an optical axis direction; a housing configured to accommodate the carrier; and a driving unit configured to move the carrier so that a distance between the reflector and the lens assembly and a distance between the reflector and the image sensor are changed simultaneously.

8 Claims, 6 Drawing Sheets

AUTOFOCUS APPARATUS AND CAMERA MODULE INCLUDING THE SAME

CROSS REFERENCE TO RELATED APPLICATIONS AND CLAIM OF PRIORITY

The present application claims priority to Korean Patent Application No. 10-2019-0143146 filed on Nov. 11, 2019, the entire contents of which is incorporated herein for all purposes by this reference.

BACKGROUND

1. Technical Field

The present disclosure relates to an autofocus apparatus and a camera module including the autofocus apparatus, and more particularly, to an autofocus apparatus or the like for implementing an autofocus function by moving an optical system located between a lens and an image sensor.

2. Background Art

As the hardware technology for image processing has been developed and the user needs for image shooting have increased, functions such as autofocus (AF) and optical image stabilization (OIS) have been applied to a camera module or the like, mounted to a portable terminal such as a cellular phone and a smart phone as well as an independent camera device.

An autofocus (AF) function (or, an automatically focusing function) means a function of a focal length to a subject by linearly moving a carrier having a lens in an optical axis direction to generate a clear image at an image sensor (CMOS, CCD, etc.) located at the rear of the lens. In addition, an optical image stabilization (OIS) function means a function of improving the sharpness of an image by adaptively moving the carrier having a lens in a direction to compensate for the shaking when the lens is shaken due to trembling.

One typical method for implementing the AF or OIS function is to install a magnet (a coil) on a mover (a carrier) and install a coil (a magnet) on a stator (a housing, or another type of carrier, or the like), and then generate an electromagnetic force between the coil and the magnet so that the mover moves in the optical axis direction or in a direction perpendicular to the optical axis.

Recently, a mobile terminal is equipped with a lens having various specifications such as a variable focal length or a long distance image to meet higher user needs and to to implement user convenience in a variety of ways.

The lens has a structure in which a plurality of lenses or lens groups are arranged side by side, or the lens has a long length based on an optical axis direction. For this reason, a larger loading space must be provided in the mobile terminal.

In addition, in the lens, a sufficient distance must be secured between the lens and the image sensor due to the unique optical characteristics of the lens, and furthermore, the lens should also be designed to ensure a more extended distance for the lens to linearly move such that the lens (a carrier to which the lens is mounted) linearly moves to realize the autofocus function.

Thus, since a device or actuator using the lens have a considerably long length, it is difficult to optimize the essential characteristics related to device miniaturization or slimming aimed at the mobile terminal, and design environments for other devices, elements and components in the mobile terminal are considerably limited.

Further, in the case of a device or actuator using the lens, since the moving distance of the lens becomes longer in order to realize an autofocus function (AF), the time for implementing the autofocus function is delayed, thereby deteriorating the efficiency of time response.

SUMMARY

The present disclosure is designed to solve the problems of the related art, and therefore the present disclosure is directed to providing an autofocus apparatus, which may effectively improve spatial utilization of the autofocus apparatus or actuator and also drastically improve time response to implement the autofocus function.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an autofocus apparatus, which includes a reflector provided to a rear side of a lens assembly and configured to change a path of a light passing through the lens assembly so that the light is oriented toward an image sensor; a carrier to which the reflector is mounted, the carrier being configured to linearly move in an optical axis direction; a housing configured to accommodate the carrier; and a driving unit configured to move the carrier so that a distance between the reflector and the lens assembly and a distance between the reflector and the image sensor are changed simultaneously.

Depending on an embodiment, the autofocus apparatus of the present disclosure may include a reflector provided to a rear side of a lens assembly and configured to change a path of a light passing through the lens assembly so that the light is oriented toward an image sensor disposed parallel to the lens assembly based on an optical axis direction; a carrier to which the reflector is mounted, the carrier being configured to linearly move in the optical axis direction; a housing configured to accommodate the carrier; and a driving unit configured to linearly move the carrier in the optical axis direction so that a straight distance between the reflector and the lens assembly and a straight distance between the reflector and the image sensor along the optical axis direction are linearly changed simultaneously, and in this case, the reflector may include a first reflection surface configured to reflect the light passing through the lens assembly; and a second reflection surface configured to reflect the light input from the first reflection surface again in a direction parallel to the optical axis direction so that the light is input to the image sensor.

In addition, the reflector of the present disclosure may include a first reflection surface configured to reflect the light passing through the lens assembly; and a second reflection surface configured to reflect the light input from the first reflection surface toward the image sensor. In this case, the first reflection surface and the second reflection surface may have a slope of 45 degrees.

Moreover, the driving unit of the present disclosure may include first and second magnets provided to the carrier; and first and second coils provided to the housing to face the first and second magnets, respectively.

According to an embodiment of the present invention, the carrier of the present disclosure may include a loading space in which the reflector is loaded, the loading space being provided in a middle portion of the carrier; and first and second mounting spaces provided at locations symmetrical with respect to the loading space and having a lower height than the loading space so that the first and second magnets are respectively mounted thereto, and in this case, the housing may have first and second holes formed to expose the first and second coils toward the first and second magnets, respectively.

In addition, at least one of the carrier and the housing further of the present disclosure may include a first guide portion configured to accommodate a plurality of first ball groups disposed between the housing and the carrier, the first guide portion being formed at an outer side of the first mounting space; and a second guide portion configured to accommodate a plurality of second ball groups disposed between the housing and the carrier, the second guide portion being formed at an outer side of the second mounting space.

For example, the reflector of the present disclosure may be made of a single prism having a trapezoidal cross section based on a horizontal plane, and each of the first and second magnets may be provided at an outer side of each of the first and second reflection surfaces.

In addition, the housing of the present disclosure may include a first opening formed in a portion facing the lens assembly; and a second opening formed in a portion facing the image sensor, and in this case, the first reflection surface may reflect the light input through the first opening to the second reflection surface, and the second reflection surface may reflect the light input from the first reflection surface to the image sensor through the second opening.

A camera module according to another aspect of the present disclosure may include an autofocus apparatus configured as above; a lens assembly disposed at a front side of the autofocus apparatus; and a reflector module disposed at a front side of the lens assembly to change a path of light input from the outside toward the lens assembly.

According to an embodiment of the present disclosure, since a light path is changed by using a reflector (an optical system) provided between the lens and the image sensor, the structure and shape of the entire autofocus apparatus may be implemented more space-intensively, thereby minimizing the overall space and further being optimized for miniaturization of a mobile terminal.

In addition, according to another embodiment of the present disclosure, since an autofocus function is implemented using a structure for linearly moving a reflector (an optical system) provided between the lens and the image sensor, a moving space for implementing the autofocus function may be further minimized.

Furthermore, in the present disclosure, the autofocus function conforming to the lens specification may be implemented with only a shortened moving distance, and furthermore, the autofocus function may be implemented with a shorter time, thereby further improving the time response characteristics for the AF function.

BRIEF DESCRIPTION OF THE DRAWINGS

The accompanying drawings illustrate an exemplary embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, exemplary embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just an exemplary example for the purpose of illustrations only, not intended to limit the scope of the disclosure, so it should be understood that other equivalents and modifications could be made thereto without departing from the scope of the disclosure.

Figure 1:
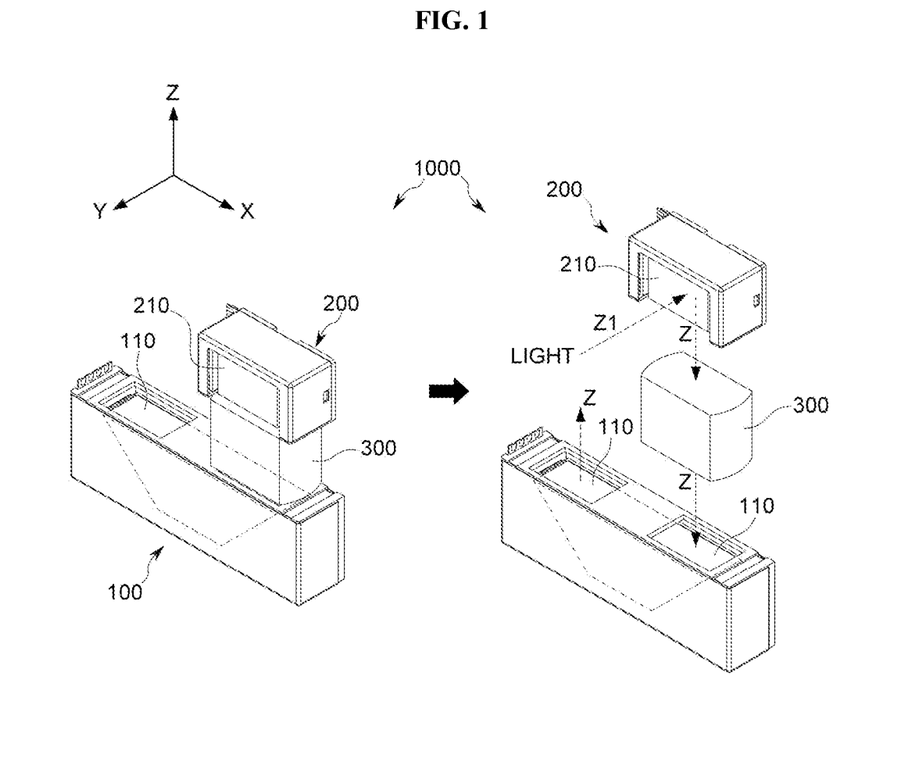
FIG. 1 is a diagram showing an overall configuration of an autofocus apparatus and a camera module according to an embodiment of the present disclosure.
Figure 2:
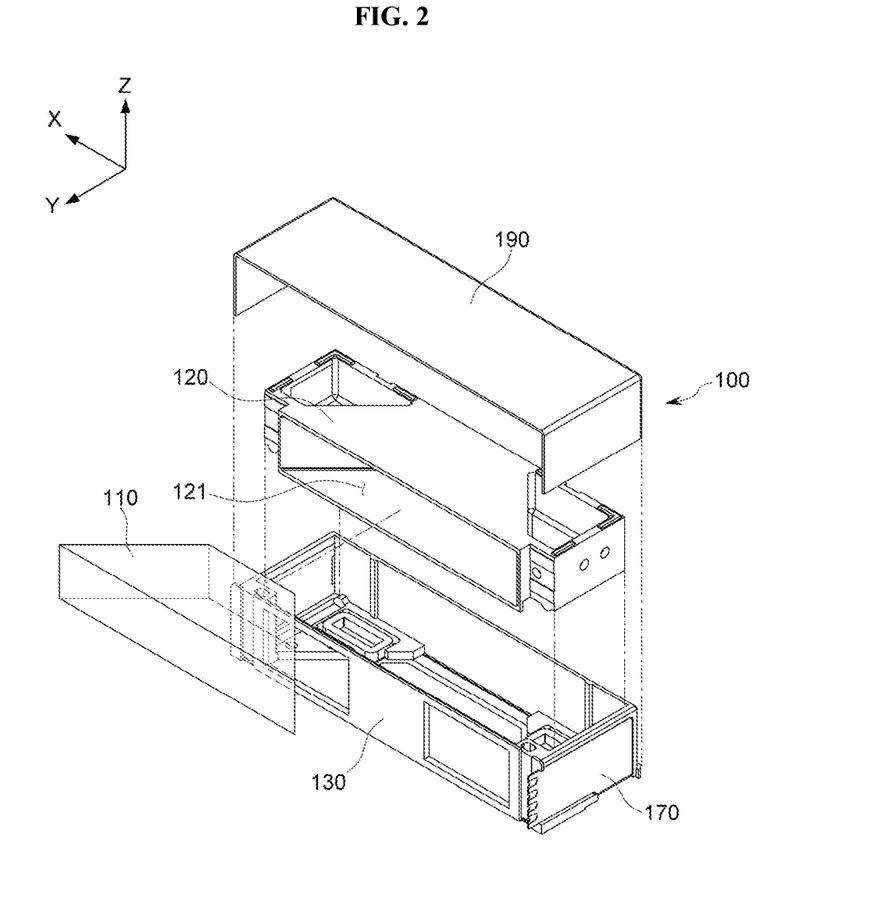
FIG. 2 is a diagram showing a configuration of the autofocus apparatus according to an embodiment of the present disclosure.
Figure 3:
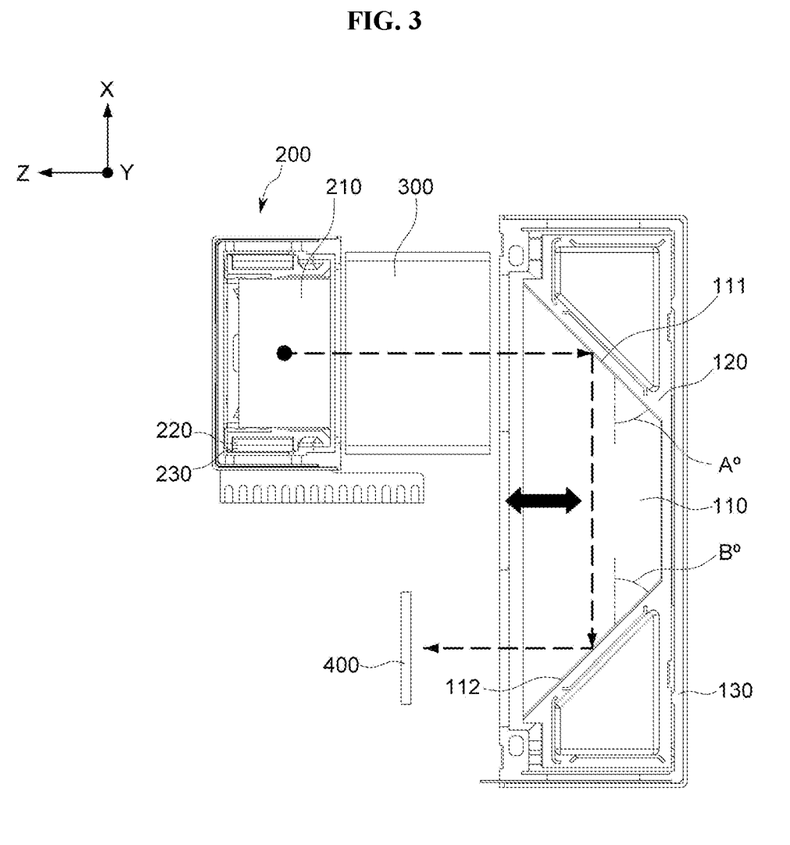
FIG. 3 is a diagram for illustrating a detailed configuration of the present disclosure and a light-path changed according to the present disclosure.

FIGS. 1 and 2 are diagrams showing an overall configuration of an autofocus apparatus 100 and a camera module 1000 according to an embodiment of the present disclosure, and FIG. 3 is a diagram for illustrating a detailed configuration of the present disclosure and a light-path changed according to the present disclosure.

As shown in FIG. 1, the autofocus apparatus 100 of the present disclosure is provided at a rear side of a lens assembly 300 (based on the Z axis) and corresponds to a device that changes a path of light passing through the lens assembly 300 so that the light is input to an image sensor 400 (see FIG. 3). The autofocus apparatus 100 of the present disclosure may be implemented as a single device in an independent form, and may also be implemented as a configuration of a camera module 1000 that includes the lens assembly 300 according to an embodiment.

Depending on an embodiment, as shown in FIG. 1, the camera module 1000 of the present disclosure may further include a reflector module 200 provided at a front side of the lens assembly 300 (based on the Z axis) to change the path of light of a subject toward the lens assembly 300.

The reflector module 200 includes an optical system 210 made of a mirror or a prism, and when the light of a subject or the like is input from the outside world (a path Z1 of FIG. 1), the reflector module 200 changes the path of the input light toward the lens assembly 300 (a path Z of FIG. 1).

Depending on an embodiment, the reflector module 200 may further include a driving unit such as a coil 230, a magnet 220, and the like. In this case, the optical system 210 is configured to rotate based on at least one of the X axis and the Y axis by the driving unit, and the rotation of the optical system 210 causes the light to move based on the X-axis or Y-axis direction, thereby implementing optical image stabilization.

If the camera module 1000 of the present disclosure includes the reflector module 200 as described above, the path of the light input from the outside is changed (refracted) once by the reflector module 200 and changed again by the autofocus apparatus 100 of the present disclosure, and then the light is input to the image sensor 400.

Hereinafter, in the present disclosure, the axis corresponding to the path along which light is input to the lens assembly 300, namely the axis corresponding to a longitudinal direction of the lens assembly 300, is defined as an optical axis (the Z axis), and two axes on the vertical plane perpendicular to the optical axis (the Z Axis) are defined as the X axis and the Y axis.

In addition, the lens assembly 300 of the present disclosure may be implemented to include one or more lenses, and if a plurality of lenses are included, the lens assembly 300 may further include an additional optical device depending on an embodiment.

As shown in FIG. 2, the autofocus apparatus 100 of the present disclosure may be configured to include a reflector 110, a carrier 120 to which the reflector 110 is loaded, a housing 130, a driving unit 140 for driving the carrier 120 to linearly move, a circuit board 170 implemented using an FPCB or the like, balls 150-1, 150-2 disposed between the carrier 120 and the housing 130, and a case 190 functioning as a shield can.

The reflector 110 of the present disclosure is provided at a rear side of the lens assembly 300 (based on the path of light passing through the lens assembly), and is configured to change the path of light so that the light passing through the lens assembly 300 is oriented toward the image sensor 400.

In order to further increase the spatial utilization of the apparatus itself and realize the compact size of the entire apparatus as described later, the reflector 110 of the present disclosure may be, for example, implemented to change the path of the light several times so that the light is finally input to the image sensor 400 based on the optical axis direction.

As shown in FIG. 3, if the reflector 110 is implemented to change the path of light so that the path of light is finally oriented in the optical axis direction, related components may also be implemented with a corresponding structural design, which may effectively overcome the conventional shape or structure that extends excessively in a specific direction such as the optical axis direction, thereby further increasing spatial utilization.

The reflector 110 of the present disclosure includes a first reflection surface 111 for reflecting light passing through the lens assembly 300 and a second reflection surface 112 for reflecting the light input from the first reflection surface 111 toward the image sensor 400.

According to an embodiment of the present invention, the sum of a slope (A°) of the first reflection surface 111 and a slope (B°) of the first reflection surface 111 may be 90 degrees so that the light input along the optical axis may be accurately output again in the optical axis direction. In order to increase the precision of the physical and optical structures, the slope (A°) of the first reflection surface 111 and the slope (B°) of the first reflection surface 111 may be, for example, 45 degrees, respectively.

The first reflection surface 111 and the second reflection surface 112 may be implemented as individual optical members, and may also be implemented using a single prism having optical properties for refraction/reflection of each inclined surface corresponding to the description.

That is, the reflector 110 according to the present disclosure may be implemented using two or more individual optical members (mirrors, prisms, etc.), and may also be implemented using a single optical member (a prism, etc.).

According to this configuration of the present disclosure, the light passing through the lens assembly 300 in the optical axis direction may be accurately input again to the image sensor 400 based on the optical axis direction without tilting or shifting.

The reflector 110 may be implemented by any one selected from a mirror and a prism, or a combination thereof, and may be implemented using various members capable of reflecting and refracting the path of an input light. Meanwhile, according to an embodiment of the present invention, the reflector 110 may be made of a glass material in order to further improve optical properties such as prevention of optical loss.

The carrier 120 of the present disclosure has a loading space 121 formed in a middle portion thereof so that the reflector 110 is installed or loaded, and corresponds to a moving object that linearly moves in the optical axis direction (the Z-axis direction) based on the housing 130 as described below. The carrier 120 of the present disclosure functions as a kind of holder that physically supports the reflector 110.

The housing 130 of the present disclosure is a frame constituting the body of the autofocus apparatus 100 according to the present disclosure. The housing 130 accommodates the carrier 120 and corresponds to a fixed body from a relative viewpoint with the carrier 120 that is a moving body.

Figure 4:
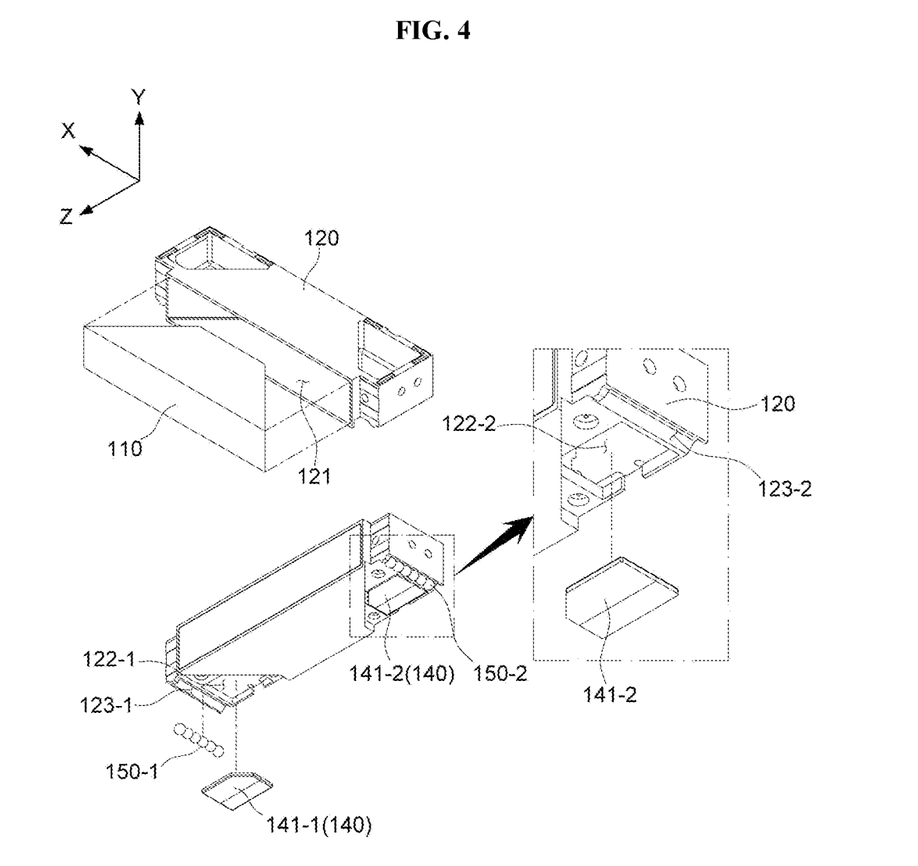
FIG. 4 is a diagram showing a carrier according to an embodiment of the present disclosure and relevant components.
Figure 5:
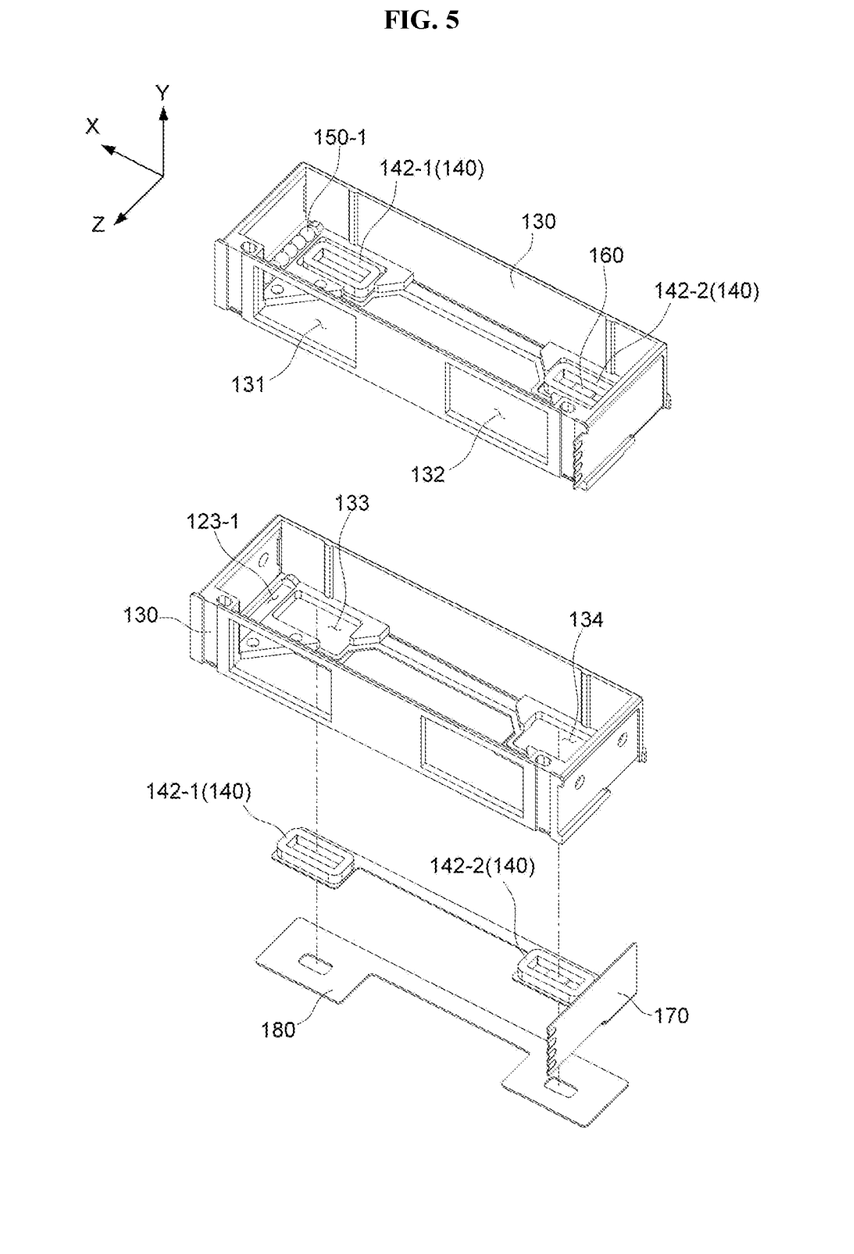
FIG. 5 is a diagram showing a housing according to an embodiment of the present disclosure and relevant components.

FIG. 4 is a diagram showing the carrier 120 according to an embodiment of the present disclosure and relevant components, and FIG. 5 is a diagram showing the housing 130 according to an embodiment of the present disclosure and relevant components.

Hereinafter, a detailed configuration of the present disclosure and a driving relationship in which carrier 120 of the present disclosure moves based on the housing 130 will be described in detail with reference to FIGS. 4 and 5.

The driving unit 140 of the present disclosure is a component that linearly moves the carrier 120 in the optical axis direction based on the housing 130. The driving unit 140 may be implemented in various application examples such as a shape memory alloy (SMA), a piezoelectric element and a micro electro mechanical system (MEMS), as long as it can move the carrier 120 in the optical axis direction using an external control signal or a sensed signal system.

However, in consideration of the efficiency of device miniaturization, power consumption, noise suppression, space utilization, linear movement characteristics, precision control, etc., the driving unit 140 may be, for example, implemented to apply an electromagnetic force generated between a magnet and a coil.

Specifically, the driving unit 140 according to an embodiment of the present disclosure may include magnets 141-1, 141-2 provided to the carrier 120 serving as a moving body and the housing 130 serving as a fixed body, and coils 142-1, 142-2 provided to the carrier 120 or the housing 130 not having the magnets 141-1, 141-2.

In order to more easily arrange electrical wirings and the circuit board 170 and also more effectively implement related components, the magnets 141-1, 141-2 according to an embodiment of the present invention may be provided to the carrier 120 serving as a moving body and the coils 142-1, 142-2 are provided to the housing 130 serving as a fixed body.

Depending on an embodiment, a single magnet and a single coil may be provided, but it is preferable that a plurality of magnets and a plurality of coils are provided at different positions as shown in the figures, so that the carrier 120 may be physically driven more stably.

To increase the driving efficiency, the first magnet 141-1 and the second magnet 141-2 provided to the carrier 120 are configured to face the first coil 142-1 and the second coil 142-2 provided to the housing 130, respectively.

Through this configuration, if power of an appropriate size and direction is applied to the coils 142-1, 142-2 provided to the housing 130 side, a magnetic force of a corresponding size and direction is generated between the magnets 141-1, 141-2 and the coils 142-1, 142-2, so that the carrier 120 equipped with the magnets 141-1, 141-2 moves forward and backward in the optical axis direction.

Meanwhile, the autofocus apparatus 100 of the present disclosure may further include a sensor 160 and a driver to increase the driving precision.

The sensor 160 is a component that senses a location of the carrier 120, specifically the reflector 110 provided to the carrier 120, and may be implemented as a hall sensor using a hall effect. Also, the sensor 160 senses a location of the first magnet 141-1 and/or the second magnet 141-2 (the location of the carrier 120, namely the location of the reflector 110), and transmits a corresponding signal to the driver. The driver controls the power of an appropriate size and direction to be applied to the first coil 142-1 and/or the second coil 142-2 using the input signal of the hall sensor 160.

Through this method, the autofocus function is implemented more precisely by cyclically utilizing an accurate location of the reflector 110 based on the optical axis direction for feedback control.

The first coil 142-1, second coil 142-2, hall sensor 160, etc. are mounted on a circuit board 170 that is electrically interfacing with an external module, power supply, external device, etc., and the driver is hall sensor 160 through SOC. Of course, it can be implemented in the form of a single chip.

The first coil 142-1, the second coil 142-2, the hall sensor 160, and the like are mounted to the circuit board 170 that is electrically interfacing with an external module, a power supply, an external device, or the like, and the driver may be implemented in the form of a single chip together with the hall sensor 160 through SOC or the like.

As shown in FIG. 4, a first mounting space 122-1 to which the first magnet 141-1 is mounted and a second mounting space 122-2 to which the second magnet 141-2 is mounted are provided to a lower surface of the carrier 120 (based on the Y axis) at locations symmetrical with respect to the loading space 121 to which the reflector 110 is mounted.

According to an embodiment of the present invention, the first mounting space 122-1 and the second mounting space 122-2 may be provided in a margin area of the carrier 120 other than the loading space 121 in which the reflector 110 is mounted, in order to increase the spatial utilization and structure utilization of the carrier 120.

That is, if the reflector 110 of the present disclosure is implemented as a single prism having a trapezoidal cross section based on the horizontal plane (the XZ plane) as described above, the first magnet 141-1 and the second magnet 141 of the present disclosure -2 are configured to be provided to diagonal surfaces of the prism (reflector) 110, namely outer sides of the first reflection surface 111 and the second reflection surface 112, respectively.

In addition, in order to lower the overall height of the carrier 120 (based on the Y axis), the first and second mounting spaces 122-1, 122-2 respectively equipped with the first magnet 141-1 and the second magnet 141-2 may be, for example, configured to have a lower height (based on the Y axis) than the loading space 121 to which the reflector 110 is mounted.

In order to correspond to this stepped structure, as show in FIG. 5, the housing 130 of the present disclosure has a first hole 133 that exposes the first coil 142-1 toward the first magnet 141-1 and a second hole 134 that exposes the second coil 142-2 toward the second magnet 141-2.

In this way, in the present disclosure, by using the stepped structure of the first and second magnets 141-1, 141-2 and the first and second holes 133, 134 of the housing 130, the first and second magnets 141-1, 141-2 and the first and second coils 142-1, 142-2 may be moved as close as possible without increasing the height of the carrier 120 itself.

As shown in FIGS. 4 and 5, a first ball group 150-1 and a second ball group 150-2 having a plurality of balls arranged in the optical axis direction are located between the housing 130 and the carrier 120.

The carrier 120 maintains a proper distance from the housing 130 by the balls 150-1, 150-2, and the carrier 120 may linearly move more flexibly with a minimized friction due to point-contact of the balls 150-1, 150-2, moving and rolling of the balls 150-1, 150-2, or the like, thereby reducing noise and minimizing the driving force required for linearly moving the carrier 120.

The housing 130 of the present disclosure includes a yoke 180 that generates attractive force to the first magnet 141-1 and/or the second magnet 141-2. The carrier 120 may continuously maintain the point-contact with the balls 150-1, 150-2 by the attractive force between the yoke 180 and the magnets 141-1, 141-2 without being deviated outward, and may also maintain an accurate exact separation distance corresponding to the diameter of the balls 150-1, 150-2 from the housing 130.

In order to more effectively implement the physical support and guide the linear movement by the balls 150-1, 150-2. As shown in FIGS. 4 and 5, at least one of the carrier 120 and the housing 130 of the present disclosure may include a first guide portion 123-1 for accommodating the first ball group 150-1 and/or a second guide 123-2 for accommodating the second ball group 150-2.

According to an embodiment of the present invention, the first guide portion 123-1 and the second guide portion 123-2 may be provided at locations biased to both sides based on the middle portion of the carrier 120 as shown in the figures.

In this configuration, when an impact is applied from the outside, the primary impact is transmitted to the balls 150-1, 150-2, which are made of a metal material having relatively strong stiffness, thereby buffering the impact applied to the internal configuration of the apparatus.

In addition, since the linear guiding by the balls 150-1, 150-2 is performed at both ends, the posture imbalance phenomenon such as tilting or twisting of the carrier 120 may be suppressed as much as possible, thereby more precisely implementing the linear movement of the carrier 120.

As shown in FIG. 5, the housing of the present disclosure has a first opening 131 and a second opening 132 formed at its surface facing the lens assembly 300. The first opening 131 is formed in a portion facing the lens assembly 300 and opens a part of the reflector 110 to serve as a window through which the light passing through the lens assembly 300 is input.

The second opening 132 is formed at the same surface as the first opening 131, and is formed in a portion facing the image sensor 400. Also, the second opening 132 opens another part of the reflector 110 to serve as a window through which the light passing through the reflector 110 is oriented toward the image sensor 400.

That is, the first reflection surface 111 of the reflector 110 reflects the light input through the first opening 131 to the second reflection surface 112 of the reflector 110, and the second reflection surface 112 reflects the light input from the first reflection surface 111 to the image sensor 400 through the second opening 132.

Through the configuration of the first opening 131 and the second opening 132 as above, it is possible to effectively block unnecessary light input from the outside by accurately specifying the area of the light input to the reflector 110 and the area of the light output from the reflector 110, and also it is possible to function as a kind of structure that enhances the physical support of the carrier 120.

Figure 6:
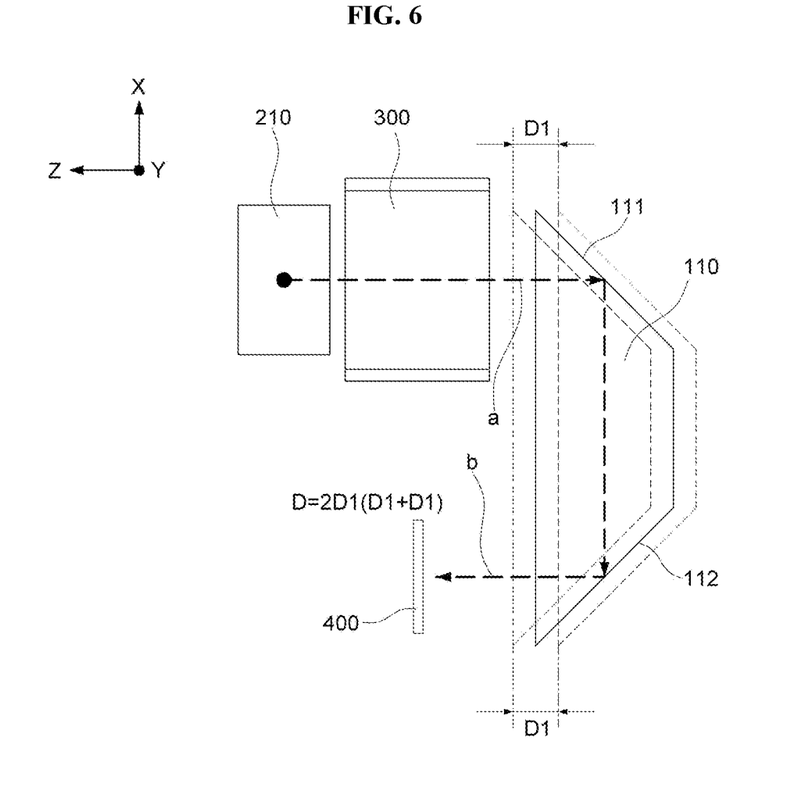
FIG. 6 is a diagram for illustrating a process of implementing an AF function according to the present disclosure.

FIG. 6 is a diagram for illustrating a process of implementing an AF function according to the present disclosure. As shown in FIG. 6, the carrier 120 of the present disclosure moves linearly in the optical axis direction in a state of including the reflector 110 for reflecting light several times.

The AF function is a function that allows a clear image to be generated at the image sensor by adjusting the distance between the lens and the image sensor. To realize the AF function, at least one of the lens and the image sensor must be physically moved based on the optical axis direction.

Depending on the optical characteristics or physical specifications of the lens, a serious problem may not occur in the case where a sufficient distance is not required between the lens and the image sensor. However, as mentioned above, in the case of a long-range lens or zoom lens, a sufficient distance or space should be secured between the lens and the image sensor due to the optical specifications of the lens, and furthermore, a moving distance for the AF function should also be secured sufficiently.

However, in the autofocus apparatus 100 according to the present disclosure or the camera module 1000 including the autofocus apparatus 100, the reflector 110 reflecting/refracting the light passing through the lens assembly 300 several times (2 times) is linearly moved, rather than moving the lens or the image sensor. Thus, if the moving range of the reflector 110 (based on the optical axis direction) is D1 as shown in FIG. 6, the separation distance D between the lens assembly 300 and the image sensor 400 is 2D1, which is twice thereof.

That is, when it is needed to move the lens assembly 300 and the image sensor 400 by a distance a for the AF function, the lens or the image sensor needs to be moved by the distance a in the conventional device. However, in the autofocus apparatus 100 of the present disclosure, it is required just to move the reflector 110 by only a distance ½a, and thus the moving range for the AF function may be used more effectively.

Furthermore, since the moving range of the reflector 110 is shortened by half compared to the conventional one, the power consumption and required time are also reduced correspondingly, thereby further improving the overall AF-related functions.

The present disclosure has been described in detail. However, it should be understood that the detailed description and specific examples, while indicating exemplary embodiments of the disclosure, are given by way of illustration only, since various changes and modifications within the scope of the disclosure will become apparent to those skilled in the art from this detailed description.

In the above description of this specification, the terms such as "first", "second", "upper" and "lower" are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An autofocus apparatus, comprising:
   a reflector provided to a rear side of a lens assembly and configured to change a path of a light passing through the lens assembly so that the light is oriented toward an image sensor disposed parallel to the lens assembly based on an optical axis direction;
   a carrier to which the reflector is mounted, the carrier being configured to linearly move in the optical axis direction;
   a housing configured to accommodate the carrier; and
   a driving unit configured to linearly move the carrier in the optical axis direction so that a straight distance between the reflector and the lens assembly and a straight distance between the reflector and the image sensor along the optical axis direction are linearly changed simultaneously,
   wherein the reflector comprises:
      a first reflection surface configured to reflect the light passing through the lens assembly; and
      a second reflection surface configured to reflect the light input from the first reflection surface again in a direction parallel to the optical axis direction so that the light is input to the image sensor.

2. The autofocus apparatus according to claim 1, wherein the first reflection surface and the second reflection surface have a slope of 45 degrees.

3. The autofocus apparatus according to claim 1, wherein the driving unit comprises:
   first and second magnets provided to the carrier; and
   first and second coils provided to the housing to face the first and second magnets, respectively.

4. The autofocus apparatus according to claim 3, wherein the carrier comprises:
   a loading space in which the reflector is loaded, the loading space being provided in a middle portion of the carrier; and
   first and second mounting spaces provided at locations symmetrical with respect to the loading space and having a lower height than the loading space so that the first and second magnets are respectively mounted thereto,
   wherein the housing has first and second holes formed to expose the first and second coils toward the first and second magnets, respectively.

5. The autofocus apparatus according to claim 4, wherein at least one of the carrier and the housing further comprises:
   a first guide portion configured to accommodate a plurality of first ball groups disposed between the housing and the carrier, the first guide portion being formed at an outer side of the first mounting space; and
   a second guide portion configured to accommodate a plurality of second ball groups disposed between the housing and the carrier, the second guide portion being formed at an outer side of the second mounting space.

6. The autofocus apparatus according to claim 3, wherein the reflector is made of a single prism having a trapezoidal cross section based on a horizontal plane; and
- each of the first and second magnets is provided at an outer side of each of the first and second reflection surfaces.

7. The autofocus apparatus according to claim 1, wherein the housing comprises:
- a first opening formed in a portion facing the lens assembly; and
- a second opening formed in a portion facing the image sensor,
- wherein the first reflection surface reflects the light input through the first opening to the second reflection surface, and the second reflection surface reflects the light input from the first reflection surface to the image sensor through the second opening.

8. A camera module, comprising:
- an autofocus apparatus of claim 1;
- a lens assembly disposed at a front side of the autofocus apparatus; and
- a reflector module disposed at a front side of the lens assembly to change a path of light input from the outside toward the lens assembly.

* * * * *